April 29, 1947.  E. K. STODOLA  2,419,606
LINEAR SAW-TOOTH GENERATOR
Filed May 13, 1944  2 Sheets-Sheet 1

INVENTOR.
EDWIN K. STODOLA
BY William D. Hall.
ATTORNEY.

April 29, 1947.  E. K. STODOLA  2,419,606

LINEAR SAW-TOOTH GENERATOR

Filed May 13, 1944  2 Sheets-Sheet 2

INVENTOR.
EDWIN K. STODOLA
BY William D. Hall,
ATTORNEY.

Patented Apr. 29, 1947

2,419,606

UNITED STATES PATENT OFFICE 2,419,606

LINEAR SAW-TOOTH GENERATOR

Edwin K. Stodola, Neptune, N. J., assignor to the United States of America as represented by the Secretary of War Application May 13, 1944, Serial No. 535,532

11 Claims. (Cl. 250—36)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a current regulating circuit and, more particularly, to a control circuit capable of maintaining the flow of direct current in a controlled circuit at a constant predetermined value.

The disclosed circuit is illustrated by way of an example in connection with a saw-tooth generator where it regulates charging current flowing into a saw-tooth generating condenser. Since the control circuit makes this charging current constant, the voltage rise across the condenser vs. time is a straight line. Ordinarily, saw-tooth waves are generated by charging a large condenser through a relatively large resistance, or other means such as a pentode vacuum tube, to produce an approximately constant charging current and very quickly discharging it through a vacuum or a gas-filled tube before the condenser becomes completely charged. Because during the initial charging period the current flowing into the condenser in such circuit is approximately constant, only the initial charging period is actually used in the output circuit of the oscillator. When the requirements for producing a linear base line are more stringent, it becomes necessary to resort to some means for correcting the inherent nonlinearity of the voltage wave produced by the charging current. When the invention is applied to the saw-tooth generating circuit, it changes the nonlinear voltage wave appearing across the condenser into a linear voltage wave.

It is, therefore, the principal object of this invention to provide a control circuit for maintaining the flow of current constant in the controlled circuit.

Another object of this invention is to provide auxiliary control circuits which, when applied to a saw-tooth generator, transform the inherently nonlinear voltage wave appearing across the condenser of the sawtooth wave generator into a linear voltage wave.

The novel features which I believe to be characteristic of my invention are set forth with particularity in the appended claims. My invention itself, however, both as to its organization and method of operation, together with the further objects and advantages thereof, may be best understood by reference to the following description in connection with the accompanying drawings in which:

Figure 6:
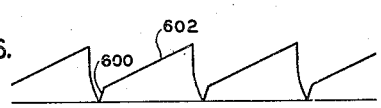
Figure 7:
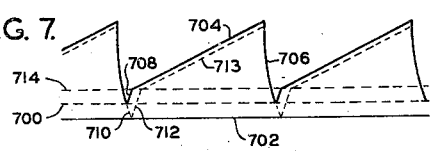
Figure 8:
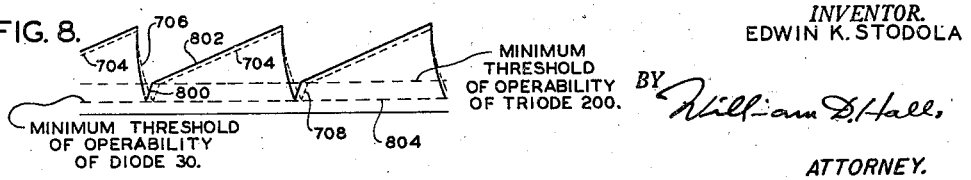

Figs. 6, 7, and 8 are oscillograms of the voltage waves appearing in the output circuits of the saw-tooth generators.

Figure 1:
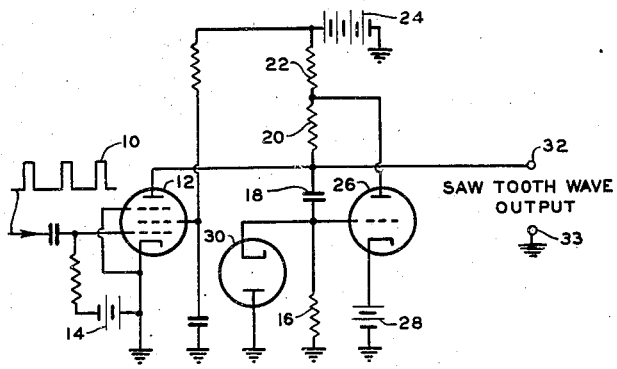
Fig. 1 is a schematic diagram of a saw-tooth generator provided with an auxiliary control circuit which makes the voltage wave appearing across the condenser vs. time a straight line.

Referring to Fig. 1, rectangular pulses 10 of short duration are impressed on the control grid of a pentode 12 which is so biased by a biasing battery 14 that it is normally nonconductive. A condenser charging circuit is connected to the plate of pentode 12, this charging circuit including a grounded resistance 16, a saw-tooth wave generating condenser 18, resistances 20 and 22, and a grounded source of potential 24. When pentode 12 is nonconductive, condenser 18 is charged by source 24 through the above mentioned charging circuit. A portion of this charging circuit is shunted by a variable impedance triode 26, the control grid of which is connected to the junction point between resistance 16 and the lower plate of condenser 18, and whose plate is connected to the junction point of between the resistances 20 and 22. The cathode of triode 26 is grounded through a cathode biasing battery 28. Resistance 16 is shunted to ground by means of a diode 30. Thus, a portion of the charging circuit of condenser 18, including resistances 16 and 20, is shunted by triode 26, and the biasing of the control grid of this triode is controlled by resistance 16 connected in series with the charging circuit of condenser 18 and the source of potential 24.

When condenser 18 charges, resistance 16 develops a positive polarity on the control grid of tube 26 which is opposed by the constant negative polarity impressed by the biasing battery 28. Therefore the conductivity of tube 26 is controlled by the resultant potential equal to the fixed potential of a reference voltage source 28 minus the variable potential developed across resistance 16. The larger the charging current, the larger is the current flowing through the shunting tube 26, and vice versa. Since the plate of the shunting tube 26 is connected to the junction point of the resistances 20 and 22, the plate current of the shunting tube 26 may be used to make the charging current flowing into the condenser constant by diverting to the shunting path a smaller or larger portion of the total current delivered by source 24. By making the charging rate of the condenser constant, the voltage rise across the condenser during its charging period follows a straight line 602 illustrated in Fig. 6. When the positive rectangular pulses 10 are impressed on the control grid of pentode 12, it is rendered fully conductive, thus shorting condenser 18 to ground, and discharging it in a short period of time. To shorten this period of discharge, resistance 16 is shunted by diode 30, so that by far the largest portion of the negative charge accumulated on the lower plate of condenser 18 is discharged across the lower impedance path of diode 30, rather than across resistance 16. The voltage saw-tooth wave 602 appearing across output terminals 32—33 is illustrated in Fig. 6.

It may be noticed by examining the wave form illustrated in Fig. 6 that the initial wave front, or the initial voltage rise, which is represented by straight lines 600, has a much steeper slope than the linear portion of the saw-tooth wave represented by straight lines 602. This sudden initial rise of voltage appearing across condenser 18 is due to the presence of resistance 16 between ground and the lower plate of condenser 18. When, upon discharging condenser 18, pentode 12 becomes nonconductive again, there is an instantaneous flow of charging current through resistance 16 resulting in correspondingly rapid rise in voltage 600 because of the instantaneous IR drop across resistance 16. Ideally this rise of voltage should be an instantaneous phenomenon, and, therefore, should form a 90° angle with the base line of the saw-tooth wave. However, because of the presence of the distributed capacitances created by the diode 30, triode 26, and resistance 16, this sudden voltage rise is not instantaneous, but forming an angle with the base line of the saw-tooth wave which is smaller than 90°. This angle may be made to approach substantially 90° by reducing the distributed capacitance of the circuit connected to the lower plate of condenser 18 and by reducing the values of the resistances in the charging circuit. In many instances this rapid voltage rise is not objectionable, and in other cases its effect may be removed, as, for example, by biasing the control grid of an amplifier for the saw-tooth wave so that only the linear portion 602 of the saw-tooth wave appears in the output circuit of the amplifier. Still further diminution of the rapid voltage rise 600 may be obtained by means of biased circuits illustrated in Figs. 4 and 5, which will be described later.

The functioning of the circuit disclosed in Fig. 1 may then be summarized as follows: pentode 12 is normally non-conductive; during this period condenser 18 has its charging period, the charging current creating a positive IR drop across resistance 16. This is used to control the conductivity of triode 26, which shunts the resistances 16, 20 and condenser 18. The conductivity of triode 26 is used in turn for controlling the linearity of the voltage saw-tooth wave appearing between ground and the upper plate of the condenser by making the charging current flowing into the condenser constant. The circuit may be thought of as a circuit in which the IR drop across resistance 16 is compared continuously with the reference voltage supplied by the biasing battery 28; the difference between these voltages is used to control the current flowing through the variable impedance path provided by triode 26 which shunts condenser 18 and resistances 16 and 20. This control current is applied to resistance 22 where it regulates the IR drop so as to tend to make the current in the charging circuit constant. A linear saw-tooth wave is the result.

Figure 2:
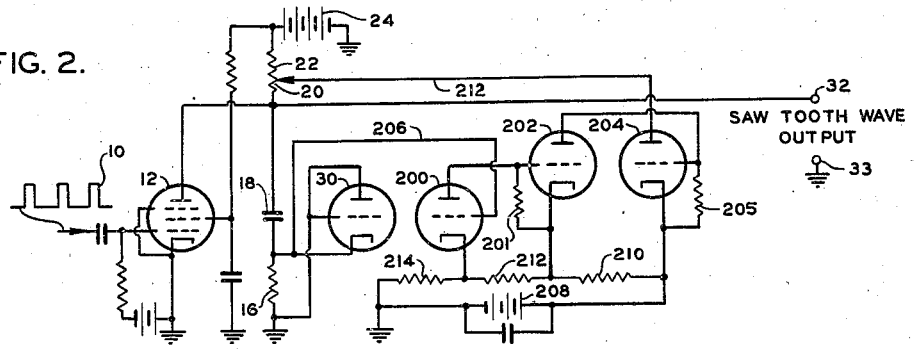
Fig. 2 is a schematic diagram of a modification of the auxiliary control circuit disclosed in Fig. 1 in which a biasing battery reference voltage is replaced with a voltage obtained from a resistance potentiometer, and a direct current amplifier having three stages of amplification, rather than one stage, is used for controlling the charging rate of the condenser.

Referring now to Fig. 2, it discloses further modification of the circuit disclosed in Fig. 1, the modification residing in the fact that three direct current amplifier tubes 200, 202 and 204 are used for controlling the linearity of the saw-tooth wave appearing across condenser 18, and the biasing battery 28, of Fig. 1 has now been replaced in Fig. 2 by a potentiometer resistor 214. The input circuits in Figs. 1 and 2 are identical, pentode 12 being used in Fig. 2 in the same manner as the same pentode in Fig. 1. The same control pulses 10 are used for rendering pentode 12 periodically conductive, during which time condenser 18 is discharged through the pentode. A triode 30 connected as a diode performs the same function as diode 30 in Fig. 1, namely, to discharge condenser 18 quickly across diode 30 and pentode 12 when the latter is rendered conductive. The charging circuit of condenser 18 is identical to the charging circuit of the same condenser in Fig. 1; it consists of a series circuit including a grounded source of potential 24, resistances 22 and 20, and the grounded resistance 16.

The circuit controlling the linearity of the saw-tooth wave begins with a conductor 206 which is connected to the control grid of triode 200. A source of potential 208 is connected to a potentiometer, consisting of resistances 210, 212 and 214, which is used for supplying proper potentials for the direct current amplifier tubes 200, 202 and 204. Moreover, resistor 214 is used as a source of reference voltage, in the same manner as the biasing battery 28 in Fig. 1, the IR drop across this resistance being compared with the IR drop across resistor 16. The difference in these voltage drops is used for controlling the conductivity of triode 200 which in turn controls the conductivities of the triodes 202 and 204. The potential drop across the resistors 214, 212, 210 is made substantially constant by making the current drawn by these resistors large in comparison with the tube currents.

The functioning of the direct current amplifier is as follows: when the potential drop across resistance 16 is approximately equal to the potential drop across resistance 214, triode 204, shunting the resistors 16, 20 and condenser 18, has a fixed conductivity, the IR drop across resistor 22 being composed of the IR drop due to the charging current flowing to condenser 18 and the IR drop due to the cathode-plate current in triode 204. When the potential across resistance 16 changes because of increase or decrease in the condenser charging current, the conductivity of triode 204 immediately changes in such a direction as to restore the charging current and the voltage drop across resistance 16 to its initial value so that it again becomes equal to the voltage drop across resistance 214. Therefore, the action of the circuit disclosed in Fig. 2 is identical to the action of the circuit disclosed in Fig. 1, except that two stages of amplification, the triodes 200 and 202 were interposed between resistor 16 and the control grid of triode 204, which acts as a variable impedance path maintaining the charging rate of condenser 18 constant. An increase in the charging current renders the triodes 200 and 204 more conductive, and triode 202 less conductive, and vice-versa.

Figure 3:
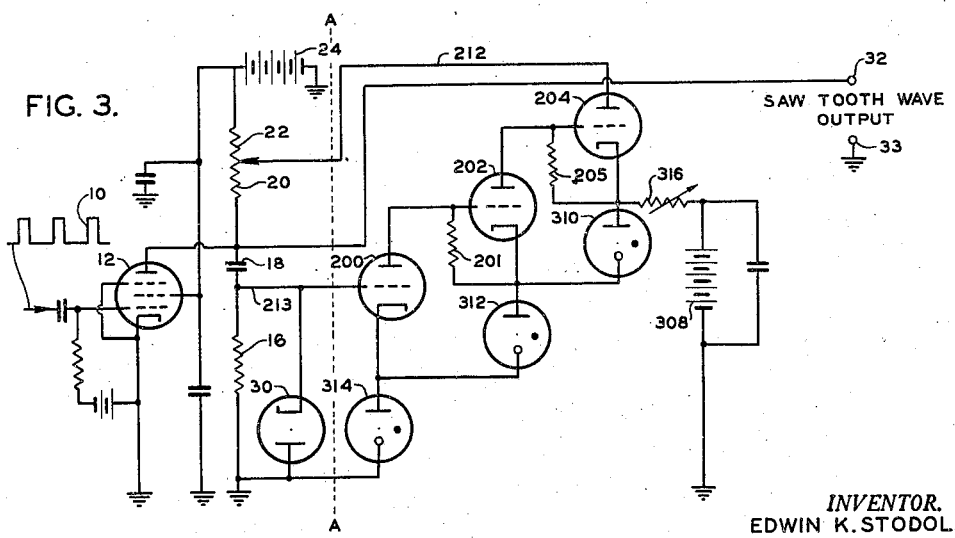
Fig. 3 is a schematic diagram of a modified form of the circuit illustrated in Fig. 2 in which the resistance potentiometer is replaced by gas-filled tubes of the voltage regulator type.

Fig. 3 is identical in all respects to Fig. 2 with one exception: the potentiometer resistors 214, 212 and 210 of Fig. 2 are replaced in Fig. 3 by gas-filled tubes 314, 312 and 310 of the voltage regulator type, which maintain the voltage drops in the potentiometer circuit more constant than the resistance elements of Fig. 2. Since the voltage drop across the gas-filled tube 314 is used as the reference voltage for controlling the conductivity of the variable impedance path formed by triode 204, any improvement in the constancy of this reference voltage will produce more faithful control of the charging rate of the condenser. This is the advantage of the circuit disclosed in Fig. 3; while in Fig. 2 any change in the conductivities of the triodes 200, 202 and 204 will have some minor effect on the total IR drop normally appearing across resistance 214, no similar variation in the reference voltage is possible in the circuit disclosed in Fig. 3. Since the gas-filled tubes require higher starting voltage than the necessary operating voltage, a variable resistance 316 is inserted in series with a source of potential 308. This resistance is adjusted after making the gas-filled tubes 310, 312 and 314 conductive to a proper value so that the triodes 200, 202 and 204 operate in the same manner as the corresponding triodes illustrated in Fig. 2.

Figure 4:
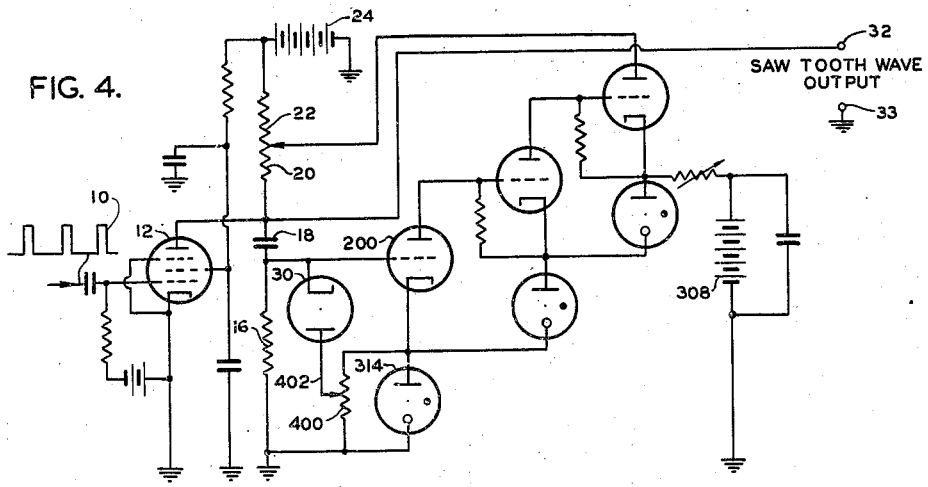
Figs. 4 and 5 are modified schematic diagrams of the circuit disclosed in Fig. 3.

Fig. 4 is a modification of the circuit disclosed in Fig. 3. A biasing resistor 400 has been connected across the gas-filled voltage regulator tube 314, and the plate of diode 30 has been connected to a point on resistor 400 by means of a potentiometer arm 402. The remaining elements and connections of the circuit in Fig. 4 are identical to the elements and connections disclosed in Fig. 3. When condenser 18 has its charging period, a substantially constant current flows through resistance 400, this constant current being produced by the potential source 308. A positive biasing potential is impressed on the plate of diode 30 through the potentiometer arm 402, this potential adjusted to keep diode 30 partially conductive so that the IR drop across resistance 10 corresponds in magnitude to a substantial part of the instantaneous IR drop 600 illustrated in Fig. 6. When pentode 12 and diode 30 are rendered conductive by the positive pulse 10, condenser 18 can not discharge any longer completely down to the ground potential, as it does in Figs. 1 through 3, but only to the potential impressed upon it at this instant by the biasing resistor 400. This is illustrated in Fig. 7 where the biasing potential level is illustrated by a dotted line 700 and the ground potential by a base line 702. The linear portion of the saw-tooth wave is illustrated by straight lines 704, the discharge periods by lines 706, and the rapid rises of voltage because of the IR drop in resistor 16 by lines 708. The wave-form of the saw-tooth wave which is suppressed because of the biasing potential impressed on the plate of diode 30 is illustrated by the dotted lines 710, 712 and 713. Line 714 in Fig. 7 illustrates that level at which tube 200 in Fig. 4 becomes conductive and becomes instrumental in controlling the charging rate of condenser 18. Certain voltage, which may be only in the order of three or four volts, must exist between the threshold of operability of triode 200 and the threshold of operability of diode 30. As mentioned previously, these thresholds are represented by the dotted lines 714 and 700, the first—for triode 200 and the second—for diode 30. This voltage difference is necessary to eliminate any possible interference of diode 30 with the linear portion of the saw-tooth wave. Since this voltage, as mentioned above, may be in the order of only a few volts, the instantaneous rise of voltage 708 becomes a very insignificant portion of the entire saw-tooth wave, and may be completely eliminated by means of proper biasing of the succeeding amplifiers. The duration of the positive rectangular pulses 10 in Fig. 4 has been made slightly shorter for adjusting the conductive period of pentode 12 to the foreshortened discharge period of condenser 18.

Figure 5:
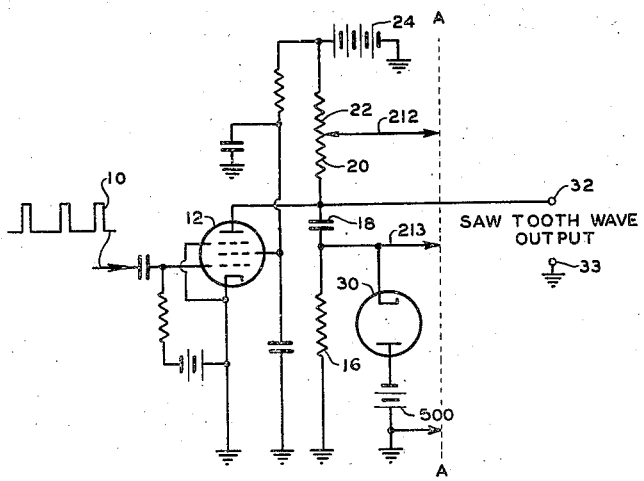

Fig. 5 illustrates another modification of the circuit disclosed in Fig. 3, this modification being also concerned, like Fig. 4, with the diminution of the sudden rise component 600. The direct current amplifier 200—202—204 is not shown in Fig. 5; the dotted line A—A in Fig. 5 corresponds to the similarly dotted line in Fig. 3. The circuits to the right of the dotted line A—A in Fig. 3 should be connected to the similarly numbered conductors 212 and 213 in Fig. 5 to complete the schematic diagram of this figure. The general principles employed in the circuit of Fig. 5 for decreasing the sudden rise component are the same as the principles employed in Fig. 4 except that a biasing voltage 500 has now been placed between ground and the plate of diode 30 thus replacing the biasing voltage previously furnished by the potentiometer resistance 400 in Fig. 4. The advantage of the circuit disclosed in Fig. 5 resides in the elimination of the resistance element 400 in the circuit of diode 30 which is directly in series with the diode circuit in Fig. 4. Inclusion of this resistance in the diode circuit raises the time constant of the discharge circuit of condenser 18—an undesirable feature lengthening the discharge period of the condenser and the extinguishing period of the cathode-ray beam. The difference between the saw-tooth wave 704—708 which is the product of the circuit illustrated in Fig. 4, and the saw-tooth wave 800—802 generated by the circuit illustrated in Fig. 5 is illustrated in Fig. 8. The advantage of the circuit illustrated in Fig. 5 becomes quite apparent from the examination of Fig. 8: a shorter discharge period and a longer duty cycle are obtained with this circuit. As in the case of Figs. 4 and 7, the duration of the positive portions of the rectangular pulses 10 has been also foreshortened to adjust them to the shorter discharge period of condenser 18.

The following illustrative values may be used in the circuit disclosed in Fig. 3:

| Tubes | Type | Tubes | Type | Resistors | Values |
| --- | --- | --- | --- | --- | --- |
| 12 | 6L6 | 310 | VR105 | 300 | 0.5 meg. |
| 30 | 6H6 | 312 | VR105 | 300a | 2.5 meg. |
| 200 | 6J5 | 314 | VR105 | 16 | 0.5 meg. |
| 202 | 6J5 | | | 201 | 10,000 ohms. |
| 204 | 6J5 | | | 205 | 50,000 ohms. |

Resistor 316 is adjusted to keep the voltage regulator tubes 316—312—314 operative. The values for the sources of potential are as follows:

|  | Volts |
| --- | --- |
| 24 | 2000 |
| 308 | 400 |
| Triggering voltage signal | 150 |

Condenser 18 is a 1 microfarad condenser.

It is believed that the construction and operation of my control circuit as well as the advantages thereof will be apparent from the foregoing description. It will, therefore, be apparent that while I have shown and described my invention in a preferred form, many changes and modifications may be made without departing from the spirit of the invention, as sought to be defined in the following claims.

I claim:

1. In a method of maintaining constant a controlled current flowing through a first fluctuating impedance, said first impedance being connected to a source of potential through a second impedance and shunted by a third controllable impedance connected to a reference voltage, said third impedance normally carrying a control current, the steps which include: generating a control voltage proportional to the flow of current through said first impedance, controlling the conductivity and the control current flowing through said third impedance by comparing said reference voltage with said control voltage, and so combining in said second impedance said control current and said controlled current as to maintain said controlled current constant irrespective of fluctuations in said first impedance.

2. The method of controlling the charging rate of a condenser connected to a source of potential through a resistance, said condenser being shunted by a controllable impedance connected to a reference voltage, the steps which include generating a control voltage proportional to the charging current of said condenser, diverting a portion of current from said source passing through said resistance to said controllable impedance controlling the magnitude of said controllable impedance and the magnitude of the diverted current by comparing said control voltage with said reference voltage, and combining the diverted current with the charging current of said condenser in said resistance so as to maintain said charging current constant.

3. In the method of controlling the charging current of a condenser connected to a source of potential through a resistance, said condenser being shunted by a controllable impedance connected to a reference voltage, the steps which include diverting a portion of current from said source passing through said resistance to said controllable impedance, generating a control voltage proportional to said charging current, and maintaining said charging current constant by controlling the magnitude of said impedance and the magnitude of the diverted current by comparing said control voltage with said reference voltage.

4. A saw-tooth generator including a series circuit of a grounded source of potential, a first resistance, a condenser, and a second grounded resistance; a first variable impedance path shunting said condenser and periodically shorting said condenser; a second variable impedance path connected between ground and a point on said first resistance; and a connection between said second resistance and said second variable impedance path for controlling the current in said second variable impedance path during the charging period of said condenser so as to maintain the charging rate of said condenser constant, said first variable impedance path comprising a normally non-conductive thermionic element with a grounded cathode and a plate connected to the junction point between said first resistance and said condenser, a diode with a grounded plate and a cathode connected to the junction point between said condenser and said second resistance, and a source of signals connected to the control grid of said thermionic element for rendering said thermionic element and said diode periodically conductive for periodically shorting said condenser.

5. A saw-tooth generator including a series circuit of a source of potential with a grounded negative terminal, a first resistance, a condenser, and a second grounded resistance; a thermionic tube having a cathode, plate and at least one grid, said grid being connected to a junction point between said condenser and said second resistance; a potentiometer connection between the plate of said thermionic element and said first resistance; a second source of potential, with a grounded negative terminal and its positive terminal connected to the cathode of said thermionic element; said series circuit, said thermionic element, said sources of potential and the connections therebetween being so constructed and arranged that the charging rate of said condenser is substantially constant during the charging period of said condenser.

6. A saw-tooth generator comprising a series circuit of a source of potential with a grounded negative terminal, a first resistance, a condenser, and a second resistance between ground and said condenser; a first normally non-conductive thermionic element having a cathode, plate and at least one grid; the cathode of said element being connected to ground and the plate of said element being connected to a junction point between said condenser and said first resistance; a diode with a grounded plate and a cathode connected to the junction point between said condenser and said second resistance; a source of periodic positive pulses connected to the control electrode of said first thermionic element, said pulses rendering said first thermionic element and said diode conductive thereby periodically discharging said condenser; a biased direct current thermionic amplifier having an input stage and an output stage, said output stage shunting said second resistance, condenser and a portion of said first resistance; and connections between said second resistance and said input stage for controlling the conductivity of said amplifier so as to maintain the charging rate of said condenser constant.

7. A saw-tooth generator comprising a series circuit of a source of potential with a grounded negative terminal, a first resistance, a condenser, and a second resistance between ground and said condenser; a biased direct current thermionic amplifier including a first, second, and a third thermionic tubes, each of said tubes having a cathode, a plate, and at least one grid; a potentiometer and a second source of potential, with a grounded negative terminal, connected across said potentiometer; said potentiometer including first, second, and third voltage regulator tubes connected in series; metallic connections between the plates of said gas-filled tubes and the respective cathodes of said thermionic tubes; coupling resistors between the plates of said first and second thermionic tubes and the plates of said second and third voltage regulator tubes respectively; connections between said coupling resistors and the control grids of said second and third thermionic tubes respectively; a connection between the grid of the first tube and said second resistance for controlling the conductivity of said first tube; and a connection between the plate of said third thermionic tube and a point on said first resistance for applying the current carried by said third element to a portion of said first resistance for regulating the voltage impressed on said condenser during the charging period of said condenser.

8. A saw-tooth generator as defined in claim 7 which further includes a variable impedance network shunting said condenser and said second resistance, and a source of periodic pulses for periodically diminishing the impedance of said network thereby periodically discharging said condenser.

9. A saw-tooth generator as defined in claim 7 which further includes a rheostat shunting said first voltage regulator tube, and a diode connected with its plate to said rheostat and with its cathode to the grid of said first thermionic tube.

10. A saw-tooth generator as defined in claim 7 which further includes a diode connected with its cathode to the grid of said first thermionic tube and a grounded source of potential connected with its negative terminal to the plate of said diode.

11. A control circuit including a series circuit of a first impedance, a second fluctuating impedance, and a third impedance, a source of potential connected across said first, second, and third impedances, whereby said first impedance generates a comparison voltage proportional to the current flowing through said second impedance, a fourth controllable impedance shunting said first and second impedances and a portion of said third impedance, said fourth impedance carrying a control current, and a connection between said first impedance and said fourth impedance, said connection impressing said comparison voltage on said fourth impedance for regulating said control current so as to maintain the current flowing through said second impedance constant.

EDWIN K. STODOLA.

REFERENCES CITED

The following references are of record in the file of this patent:

UNITED STATES PATENTS

| Number | Name | Date |
|---|---|---|
| 2,039,119 | Schlesinger | Apr. 28, 1936 |
| 2,180,364 | Norton | Nov. 21, 1939 |
| 2,126,243 | Busse | Aug. 9, 1938 |
| 2,178,772 | Bahring | Nov. 7, 1939 |
| 2,281,948 | Pieplow | May 5, 1942 |